United States Patent [19]

Watanabe et al.

[11] Patent Number: 4,791,289
[45] Date of Patent: Dec. 13, 1988

[54] LINEAR SCALE MEASURING DEVICE

[75] Inventors: Yoshio Watanabe; Takeshi Kitayama; Shiratori Kazuo, all of Mobara, Japan

[73] Assignee: Futaba Denshi Kogyo Kabushiki Kaisha, Mobara, Japan

[21] Appl. No.: 49,299

[22] Filed: May 13, 1987

[30] Foreign Application Priority Data

May 21, 1986 [JP] Japan .................. 61-075355[U]

[51] Int. Cl.$^4$ .................................................. H01J 3/14
[52] U.S. Cl. .............................. 250/237 G; 356/375; 356/374
[58] Field of Search ............ 250/237 G, 231 SE; 340/347 P; 356/373–375; 248/629, 630, 614, 603, 604

[56] References Cited

U.S. PATENT DOCUMENTS 3,531,650 9/1970 Cronin ................... 250/237 G
4,060,903 12/1977 Ernst ..................... 250/237 G Primary Examiner—Edward P. Westin
Assistant Examiner—Khaled Shami
Attorney, Agent, or Firm—Oblon, Fisher, Spivak McClelland & Maier

[57] ABSTRACT

A linear scale measuring device capable of minimizing an error in measuring which occurs due to vibration and/or shock, carrying out the mounting on a machine tool or the like at a sufficient degree of freedom and being efficiently assembled. The device includes a slider having an index scale arranged opposite to a main scale and adapted to be moved in relation to the main scale and a stationary link to which the slider is securely connected. The slider is connected to the stationary link at two positions defined along a movement direction of the slider by an elastic connection means comprising a coil spring and a wire spring which act to force the slider toward the main scale.

2 Claims, 3 Drawing Sheets

LINEAR SCALE MEASURING DEVICE

BACKGROUND OF THE INVENTION

1. Field of the Invention

This invention relates to a linear scale measuring device for electronically and optically reading the amount of linear movement of a slide table of, for example, a machine tool or the like by means of optical lattices, and more particularly to a connecting structure between a stationary link of an optical detecting head section of the measuring device and a slider having an index scale.

2. Description of the Prior Art

In order to improve working accuracy of a machine tool or the like, a linear scale measuring device using moire fringes which is schematically shown in FIGS. 3 and 4 is used on the machine tool. FIG. 3 shows a fragmentary perspective view of the machine tool having the linear scale measuring device 1 installed on a bed 3 and a slide table 4 of the machine tool. The measuring device 1 measures the amount of movement of the slide table 4 with respect to the bed 3 so that work on the slide table 4 during working operation and the like may be precisely positioned.

The slide table 4 of the machine tool 2 is engaged with a guide means provided on the bed 3 fixed on a floor and is linearly moved with respect to the bed 3. On one side surface of the slide table 4 is fixed a transparent main scale 6 by means of a mounting frame 5. The main scale 6 is formed into an elongated rectangular shape and arranged in such a manner that a longitudinal axis thereof is substantially parallel to a direction of movement of the slide table 4 and a surface thereof is parallel to the side surface of the slide table 4. A surface of the main scale 6 is formed thereon with vertical fine optical lattices 7 which have a diameter of, for example, about 10-20 $\mu$m and arranged at intervals of, for example, about 10-20 $\mu$m. The bed 3 is provided with a detecting head 8, which is fixed on the bed 3 and arranged opposite to the main scale 6. On a portion of the detecting head 8 facing the main scale 6, a stationary link 9 is mounted.

FIGS. 4a and 4b each show a relationship between the main scale 6 and a slider 14. As shown in FIGS. 4a and 4b, the stationary link 9 is provided with projections 10 and 11 on both ends thereof in the longitudinal direction of the main scale 6. As shown in FIG. 4(b), a tension bar 12 is mounted on the projection 11, is extended in parallel to the main scale 6 toward the projection 10 and has a free end terminated at a substantially central position between both projections 10 and 11. On the free end of the tension bar 12 is fixed a ball-and-socket joint 13. The slider 14 is connected to the stationary link 9 by means of the tension bar 12 having the ball-and-socket joint. The slider 14 is formed into a substantially rectangular shape and is provided with a transparent index scale having optical lattices, of the same construction as the optical lattices 7 of the index scale 6, and which are vertically arranged thereon. Also, there is provided a circular mounting hole 15 having a boss 15a at a side of the slider 14 opposite to the stationary link 9 and further having a substantially central portion thereof, in which the ball-and-socket joint 13 of the tension bar 12 is fitted. Thus, the slider 14 is connected to the stationary link 9 so that it may be pivotally moved about the ball-and-socket joint 13 with a certain degree of freedom. When the device 1 is assembled, the slider 14 is forced against the main scale 6 due to the elastic force of the tension bar 12, and is movably contacted with the main scale 6 by means of a bearing (not shown). Also, the optical lattices of the index scale are inclined at a micro-angle with respect to the optical lattices 7 of the main scale 6 and both scales face each other with a gap of a predetermined microdistance. Further, the detecting head 8 is provided with a light source (not shown) and a light receptor (not shown) opposite to each other with both scales interposed therebetween. Reference numeral 16 designates a counter which is connected to the light receptor of the detecting head 8 to display the amount of movement of the slide table 4.

In the conventional linear scale measuring device 1 constructed as explained hereinabove, when the optical lattices 7 of the main scale 6 are superposed on those of the index scale at a micro-angle, a fringe pattern called moire fringes is produced on the scales. Intervals between the moire fringes thus formed may be adjusted depending on an angle between the lattices of both scales. Also, when both scales are moved with respect to each other in the direction perpendicular to that of the lattices, the moire fringes are moved in the longitudinal direction of the lattices perpendicular to that of the relative movement. Then, the light source of the detecting head 8 is turned on to emit light, which is received by the light receptor passing through the main scale and index scale.

Subsequently, when the slide table 4 is moved, the main scale 6 fixed on the slide table 4 slides in relation to the slider 14 of the detecting head 8 fixed on the bed 3, and the moire fringes are moved in order depending on a the amount of relative movement between both scales. Thus, the light from the light source is intermittently intercepted by the moire fringes, and the light receptor concerts movement of the moire fringes into an electrical signal. Then, an output of the receptor thus obtained is then subjected to a suitable processing such as integration or the like by the counter 16 so that a the amount of movement of the slide table 4 or a the amount of movement of a work (not shown) on the slide table 4 may be displayed on a display section of the counter 16.

As explained hereinabove, the conventional linear scale measuring device 1 is contructed in such a manner that the slider 14 is mounted on the free end of the single tension bar 12 provided at the stationary link 9 so as to be forcedly abutted against the main scale 6 due to the elastic force of the tension bar 12. Thus construction causes the force of the tension bar 12 to be applied to only one portion of the slider 14, to thereby deteriorate the balance of the force applied to the slider to a degree sufficient to render the slider unstable with respect to the main scale 6. This results in the slider 14 being pivotally moved about the circular hole 15 and ball-and-socket joint 13 which serves as a connection means between the tension bar 12 and the slider 14, and a relative position between both optical lattices is varied leading to a failure in measurement.

Also, the conventional device is disadvantageous in that any shock and/or vibration often causes the ball-and-socket joint 13 of the tension bar 12 to disengage from the circular hole 15 of the slider, which results in an error in the measuring of relative movement between both scales.

Further, when the stationary link 9 on which the slider 14 is mounted is removed from the detecting head 8 to separate the slider and main scale 6 from each other, the slider 14 can be freely and pivotally moved at the free end of the tension bar 12. However, it is almost impossible to contact the slider 14 with the main scale 6 again at a normal state to mount the stationary link 9 on the detecting head 8, because the slider 14 has an excessive degree of freedom, which results in the assemblies being troublesome.

Furthermore, the conventional linear scale measuring device has other disadvantages. The manufacturing process is complicated and the manufacturing cost is higher, because it requires the steps of covering the circular hole 15 with a cap 15b after the steps of providing the ball-and-socket joint 13 at the free end of the tension bar 12 and fitting it in the circular hole 15 of the slider 14.

SUMMARY OF THE INVENTION

The present invention has been made in view of the foregoing disadvantages of the prior art.

Accordingly, it is an object of the present invention to provide a linear scale measuring device which is capable of sliabilizing various positional relationships between a slider and a main, such as a distance therebetween, an inclination therebetween, and the like, thereby to minimize or substantially prevent any error in measurement irrespective of any shock and/or vibration applied thereto.

It is another object of the present invention to provide a linear scale measuring device which is capable of connecting a slider to a stationary link in a simple manner so as to prevent free movement of the slider and allow the slider to be moved in a direction other than its movement direction due to application of force thereto so that a sufficient degree of freedom may be ensured during mounting of the device on a machine tool or the like and assembling of the device may be carried out with high efficiency, thereby to reduce the manufacturing cost significantly.

In accordance with the present invention, a linear scale measuring device is provided. The device includes a main scale formed with optical lattices and a slider having an index scale arranged opposite to the main scale. The slider is moved in relation to the main scale. The device is adapted to measure the amount of relative movement between the main scale and the slider. Also, the slider is securely connected to a stationary link. The connection of the slider to the stationary link is carried out at two positions along a movement direction of the slider by an elastic connection means.

According to the present invention, the elastic connection means connects the slider to the stationary link at the two positions along the movement direction of the slider. This prevents the slider from being rendered unstable when it is released from the main scale, to thereby facilitate reassembling of the device. Also, this causes the connection of the slider to the stationary link to be positively and securely carried out without deteriorating the contact of the slider with the main scale due to vibration and/or shock applied thereto during a measuring operation.

BRIEF DESCRIPTION OF THE DRAWINGS

These and other ojects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a linear scale measuring device according to the present invention will be described with reference to FIGS. 1 and 2.

Figure 1A:
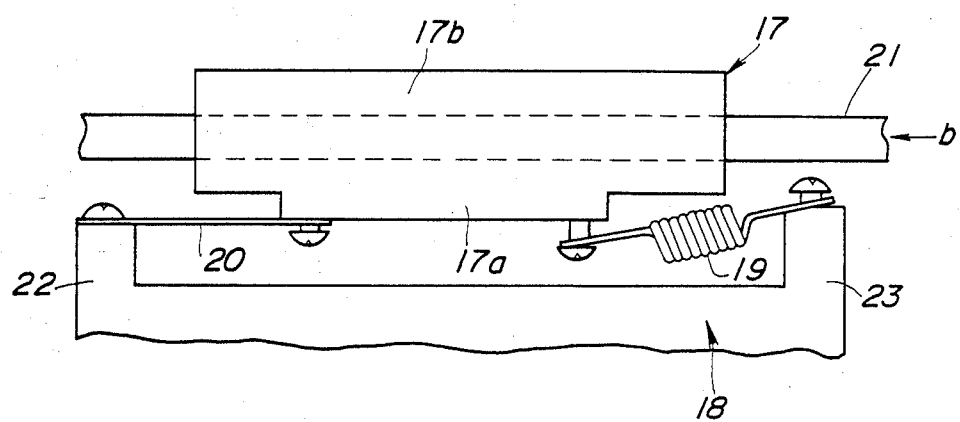
FIG. 1(a) is a bottom view showing an essential part of an embodiment of a linear scale measuring device according to the present invention wherein a slider connected to a stationary link is pressed against a main scale.
Figure 2A:
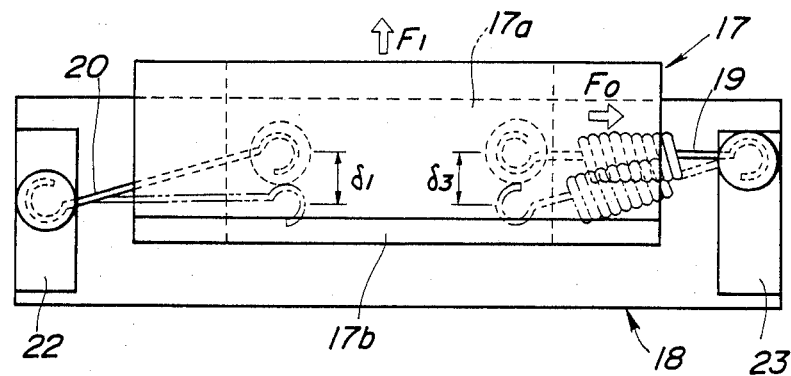
FIG. 2(a) is a front elevation view showing an arrangement of a stationary link and a slider connected to the stationary link in the embodiment of FIG. 1(a)
Figure 2B:
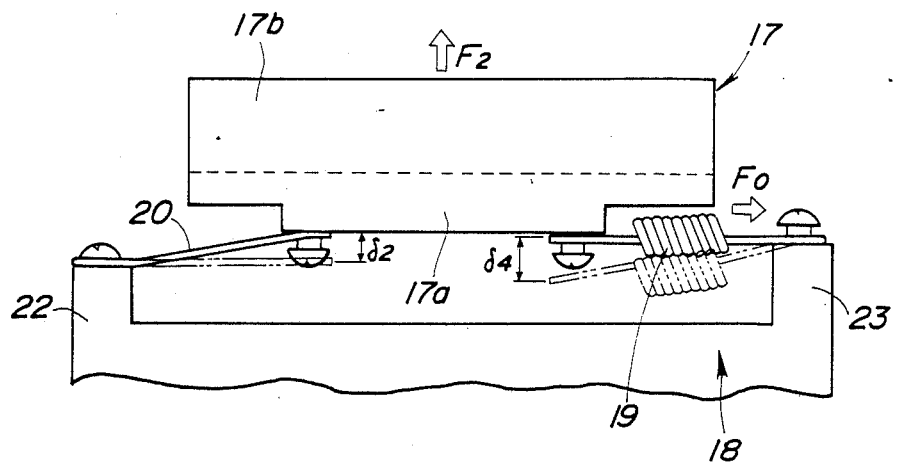
FIG. 2(b) is a bottom view of FIG. 2(a)
Figure 3:
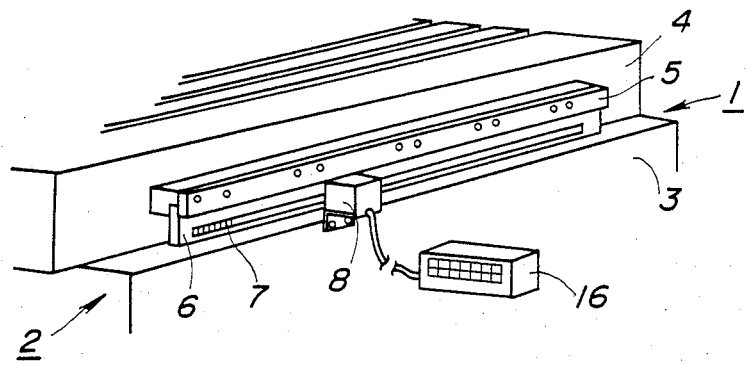
FIG. 3 is a perspective view showing an example of a conventional linear scale measuring device which is mounted on a bed and a table of a machine tool.
Figure 4A:
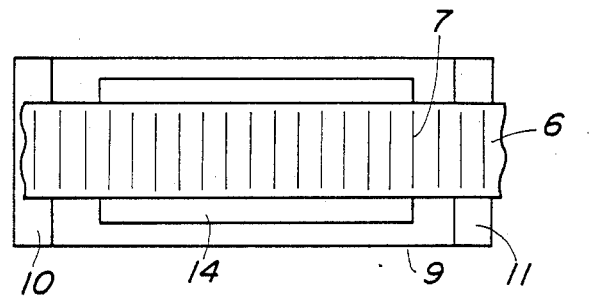
FIG. 4(a) is a front elevation view showing a relationship between a main scale and a slider in the conventional device of FIG. 3.
Figure 4B:
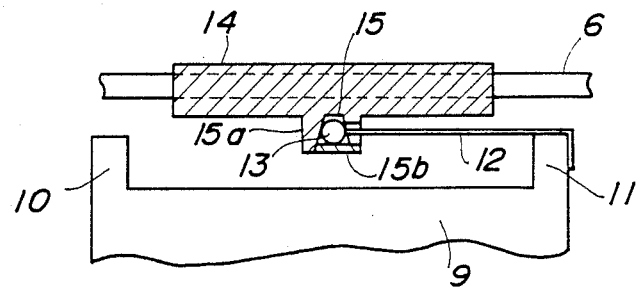
FIG. 4(b) is a bottom view partly in section of FIG. 4(a).

FIG. 1(a) is a bottom view showing an embodiment of a linear scale measuring device according to the present invention wherein a slider is pressed against a main scale and FIG. 2(b) is a view taken along an arrow b in FIG. 1(a). FIGS. 2(a) and 2(b) are a front elevation view and a bottom view each showing an arrangement of a stationary link and a slider connected to the stationary link, respectively.

A feature of a linear scale measuring device of the embodiment shown in FIGS. 1 and 2 resides in a connection structure between a slider 17 and a stationary link 18. The remaining parts and measuring operation are substantially the same as that of a conventional device.

FIG. 2 shows a connection between the slider 17 and the stationary link 18 by means of an elastic connection means made of a tension coil spring 19 and a wire spring 20, wherein solid lines indicate a state in which the slider 17 is not pressed against a main scale 21 or the stationary link 18 is not mounted on a machine tool or the like, while two-dot chain lines indicate a position of each of both springs 19 and 20 when pressing the slider 17 against the main scale 21 as shown in FIG. 1.

The main scale 21 is formed into an elongated rod-like shape and fixedly mounted on a slider table of a machine tool. The main scale 21 is arranged so as to be movable together with the slide table in a longitudinal direction thereof. On a head of the machine tool, a detecting head is securely fixed, and the stationary link 18 is mounted on a side of the detecting head facing the main scale 21. The stationary link 18 is provided with projections 22 and 23 at both ends thereof along a movement direction of the main scale 21. The height of the projection 23 is higher than that of the projection 22. The wire spring 20 is supported at a base or proximal end thereof on the projection 22 and the coil spring 19 is held at a base or proximal end thereof on the projection 23. The slider 17 and stationary link 18 are securely connected to each other by the elastic connection means constituted by both springs 19 and 20.

Now, a state before the slider 17 is pressed against the main scale 21 will be decribed.

The slider 17 is formed into a substantially elongated rectangular shape and provided with a mounting projection 17a on a side thereof facing the stationary link 18. Also, the slider 17 is provided with a flange 17b on a lower edge portion of a side thereof facing the main scale 21 in a manner to project in the direction opposite to the mounting projection 17b. The flange 17a is engaged with a lower edge 21a of the main scale 21 to guide it. In addition, the slider 17 is provided with a ball bearing at a portion thereof contacting with the main scale 21 (not shown) so that smooth sliding of the slider 17 with respect to the main scale 21 may be carried out and an index scale (not shown) provided at the slider 17 may face the main scale 21 with a predetermined interval defined therebetween.

The wire spring 20 fixed at its base or proximal end on the projection 22 of the stationary link 18 is arranged in such a manner that a distal end therof is positioned toward the main scale 21 arranged obliquely upwardly with respect to the spring 20. More specifically, the wire spring 20 is arranged to extend in an oliquely upward direction when viewed from a front side of the slider 17 as shown in FIG. 2(a) and arranged to extend in a forward direction when viewed from a bottom side of the main scale 21 as shown in FIG. 2(b). The other end or distal end of the spring 20 is pivotally connected to a portion of the mounting projection 17a of the slider 17 facing the projection 22.

An end of the coil spring 19 is pivotally connected to the other projection 23 of the stationary link 18 so as to horizontally extend in the movement direction of the slider 17. The other end of the coil spring is pivotally connected to the mounting projection 17a of the slider 17 facing the projection 23. This arrangement of the coil spring 17 permits the slider 17 to be biased toward the projection 23 by tensile force Fo of the spring 19.

Now, engagement of the main scale 21 with the slider 17 which is slung up above the stationary link 18 by means of the wire spring 20 and coil spring 19 will be described hereinafter.

Figure 1B:
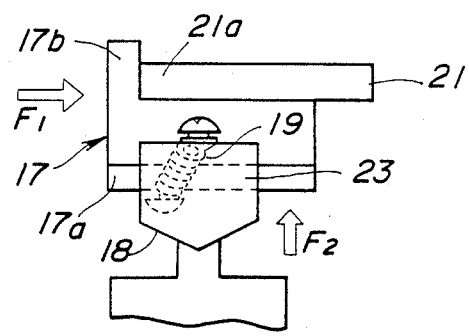
FIG. 1(b) is a view taken along an arrow b of FIG. 1(a)

As shown in FIGS. 1(a) and 1(b), the stationary link 18 is mounted on the detecting head of the measuring device in such a manner that the flange 17b of the slider 17 is engaged with the lower edge 21a of the main scale 21 and the surfaces of the slider 17 and main scale facing each other are arranged opposite to each other by means of the bearing (not shown). This causes the slider 17 to be forced toward the stationary link 18 from the position described above and pressed down as viewed from the front side thereof. At this time, the wire spring 20 is deflected by a distance of $\delta_2$ toward the stationary link 18 and by a distance of $\delta_1$ in a downward direction as indicated by the two-dot chain lines in FIGS. 2(a) and 2(b). Also, the coil spring 19 is deflected by a distance of $\delta_4$ toward the stationary link 18 and by a distance of $\delta_3$ in a downward direction. This causes the elastic force of the wire spring 20, which is returned to the original position, to act against the deflection and tensile force of the coil spring 19, which is deflected to act on the slider 17, and the slider 17 is positively pressed against the main scale 21 in an obliquely upward direction. The force occurring due to the pressing has a vertical components F1 which causes the flange 17b to be pressed against the lower edge 21a of the main scale as shown in FIG. 2(a), and a horizontal component F2 which causes the surface of the slider 17 to be pressed against the surface of the main scale 21 opposite thereto as shown in FIG. 2(b).

In the linear scale measuring device of the illustrated embodiment, when the slider table of the machine tool is moved, the flange 17b of the slider 17 guides the main scale 21 to ensure its smooth movement.

Also, the slider 17 is pressed against the the main scale 21 due to the components F1 and F2 of force F and is connected to the stationary link 18 at the two positions defined in the movement direction. Accordingly, it is firmly held with respect to the stationary link. Thus, each when vibration and/or shock are applied to the slider 17 during measuring operation, deviation of the slider 17 is effectively prevented, thereby to permit the measuring to be carried out with high precision.

Also, in the illustrated embodiment, one side of the slider 17 is securely connected to the stationary link 18 by means of the wire spring 20 in cooperation with the coil spring 19, which is arranged in the manner that an axial direction thereof is parallel to the movement direction of the main scale 21. Together, the two springs constitute elastic connection means. Also, the tensile force Fo of the coil spring 19 prevents generation of any backlash at the connection between the wire spring 20 and the slider 17. Thus, the linear scale measuring device accoridng to this embodiment prevents deviation of the slider 17 in the movement direction of the main scale 21 during the movement so that the amount of movement of the main scale 21 may be measured with high precision.

Further, the structure for connecting the slider 17 to the stationary link 18 in the illustrated embodiment not only prevents the slider 17 from being rendered unstable when it is disengaged from the main scale but permits the slider 17 to be moved with a certain degree of freedom in the direction other than the movement direction of the slider 17. Accordingly, mounting of the measuring device on the machine tool is accomplished to provide a sufficient degree of freedom.

The above explanation has been made in connection with a linear scale measuring device utilizing moire fringes. However, it is a matter of course that the present invention is applicable to different types of linear scale measuring devices. For example, it is applicable to the linear scale measuring devices in which optical lattices of a main scale and an index scale are formed so as to be parallel to each other to optically carry out measuring, or lattices of an index scale each comprise a light receptor element constituted by a semiconductor formed on a silicon substrate and a main scale is arranged so as to be relatively movable between the index scale and a light source, and the like.

As can be seen from the foregoing, the linear scale measuring device of the present invention is constructed in the simple manner that the slider is connected to the stationary link by the elastic means at the two positions along the movement direction of the slider. Thus, it will be noted that the device of the present invention is capable of minimizing an error in measuring operation which occurs due to vibration and/or shock, carrying out the mounting on a machine tool or the like at a sufficient degree of freedom and being efficiently assembled.

While a preferred embodiment of the invention has been described with a certain degree of particularity with reference to the drawings, obvious modification and variations are possible in the light of the above teachings. It is therefore to be understood that within the scope of the appended claims, the invention may be practied otherwise than as specifically described.

What is claimed as new and desired to be secured by Letters Patent of the United States is:

1. A linear scale measuring device comprising:

a main scale formed with optical lattices;

a slider having an index scale arranged opposite to said main scale, said slider and said main scale being mounted for relative movement along a predetermined direction;

a stationary link to which said slider is securely connected;

means for optically measuring the amount of relative movement between said main scale and said slider; and elastic connection means connecting said slider to said stationary link at two positions along said predetermined direction, said elastic connection means comprising means for biasing said slider toward said main scale.

2. The linear scale measuring device as defined in claim 1, wherein said elastic connection means comprises a coil spring and a wire spring which are arranged to force said slider toward said main scale.

* * * * *